Oct. 3, 1944.    L. G. BROWN    2,359,289
SHUTTER
Filed Jan. 24, 1942    3 Sheets-Sheet 1
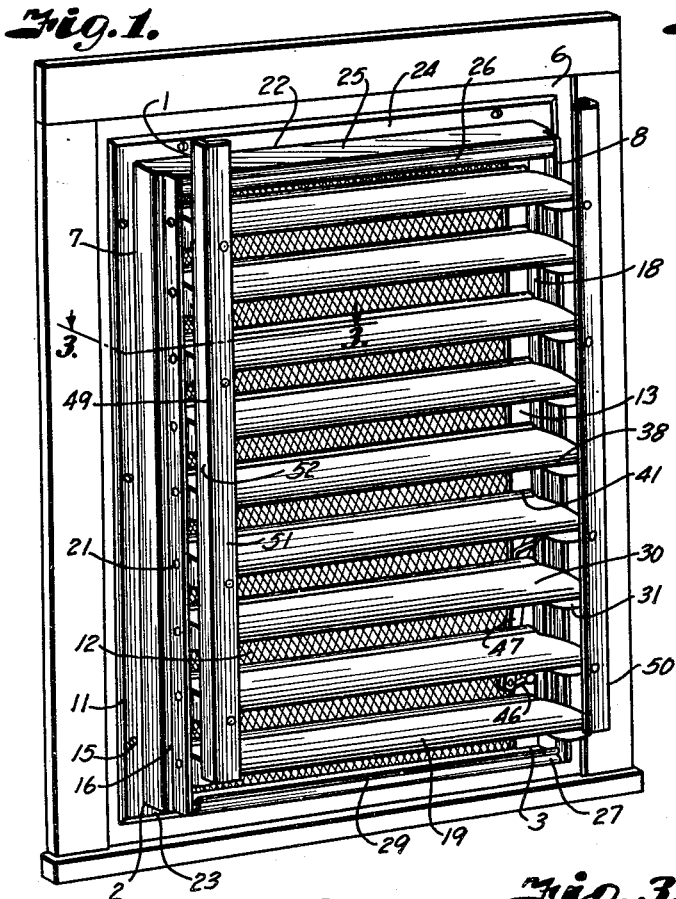
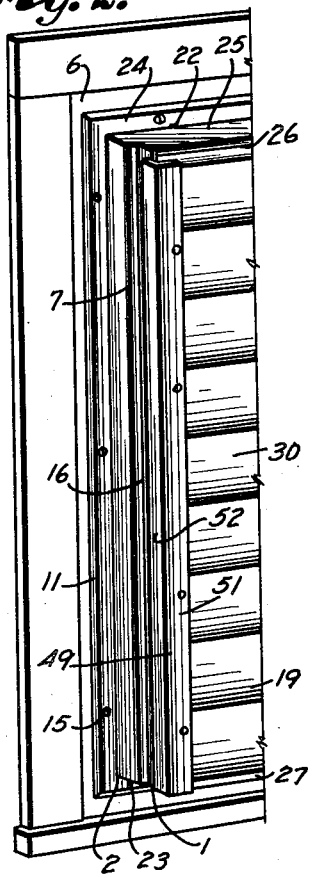
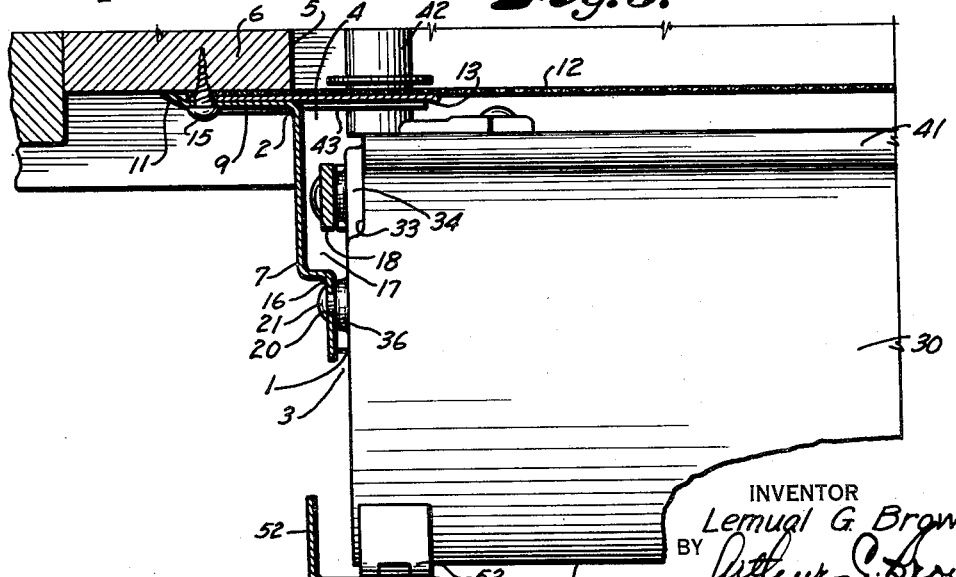
INVENTOR
Lemuel G. Brown.
BY
ATTORNEY Oct. 3, 1944.  L. G. BROWN  2,359,289
SHUTTER
Filed Jan. 24, 1942  3 Sheets-Sheet 2
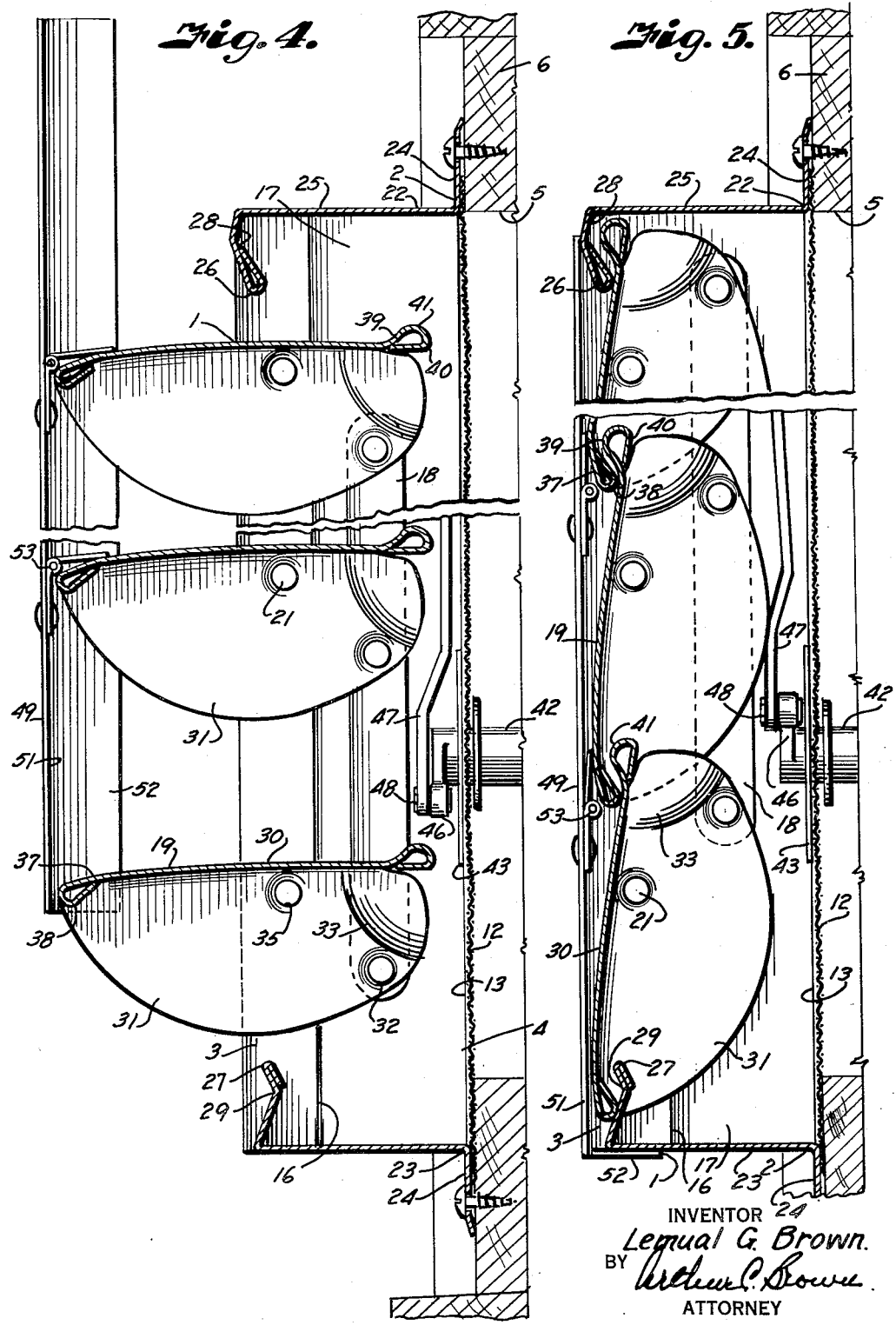
INVENTOR
Lemual G. Brown.
BY Arthur C. Brown
ATTORNEY Oct. 3, 1944.　　　　　L. G. BROWN　　　　　2,359,289
SHUTTER
Filed Jan. 24, 1942　　　　3 Sheets-Sheet 3

INVENTOR
Lemual G. Brown.
BY Arthur C. Brown.
ATTORNEY

Patented Oct. 3, 1944

2,359,289

UNITED STATES PATENT OFFICE 2,359,289

SHUTTER

Lemual G. Brown, Oklahoma City, Okla., assignor to J. E. Bush, Dallas, Tex.

Application January 24, 1942, Serial No. 428,077

9 Claims. (Cl. 20—62)

This invention relates to shutters, particularly for shading windows, doorways and similar openings, and has for its principal object to provide a shutter structure of this character which is useful in time of war to protect such openings from flying debris and fragments resulting from bomb explosions and which excludes escape of light rays in time of "blackouts."

Other objects of the invention are to provide a shutter structure equipped with louvers arranged to be closed tightly; to provide a shutter equipped with light traps; to provide a shutter with louvers having ends shaped to prevent sunrays from passing between the ends of the louvers when the louvers are in open position and to exclude light rays when the louvers are closed; to provide the shutter with an operating mechanism adapted for manipulation from within the building and arranged to lock the shutter in closed position so as to prevent opening thereof from the exterior of the building; and to provide a shutter of strong, light weight construction so that if desired it may be mounted on a window or door screen covering the opening.

In accomplishing these and other objects of the invention, as hereinafter pointed out, I have provided improved details of structure, the preferred form of which is illustrated in the accompanying drawings, wherein:

Fig. 1 is a perspective view of a shutter embodying the features of the present invention and shown as attached to the screen frame of a window opening, the louvers being shown in open position to admit light and air through the window.

Fig. 2 is a fragmentary perspective view showing the louvers in closed position for excluding escape of light rays through the opening and forming protection to the window in case of bombing raids, fire, "blackouts," and the like.

Fig. 3 is a horizontal section through one side of the shutter taken on the line 3—3 of Fig. 1.

Fig. 4 is an enlarged vertical section through the shutter structure showing the louvers in open position, the central portion of the structure being broken away to permit a larger size illustration.

Fig. 5 is a similar section showing the louvers in closed position.

Referring more in detail to the drawings:

1 designates a shutter structure embodying the features of the present invention and which includes a boxlike frame 2 having open front and rear faces 3 and 4 substantially conforming in size to the opening 5 of a screen frame 6 on which it may be installed as later described.

Figure 6:
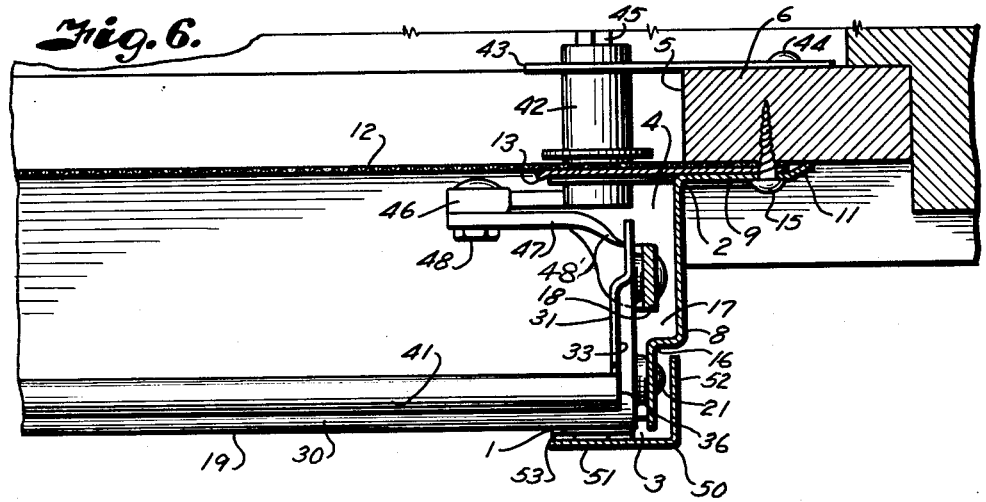
Fig. 6 is a horizontal section through the opposite side of the shutter showing the louvers in closed position.

The frame 2 includes sides or stiles 7 and 8 formed of sheet metal shaped to provide outwardly directed attaching or base flanges 9 and outwardly extending web or side portions 10. The attaching flanges 9 have their outer edges terminating in inclined lips 11 to cover the edge of the screen covering 12 and accommodate vertically arranged sheet metal guard strips 13 between the screen 12 and the faces of the flanges 9. The flanges 9 are provided with openings 14 for passing fastening devices such as screws 15 by which the side stiles of the frame are attached to the window screen frame 6, as shown in Fig. 6. The side portions of the side stiles project outwardly from the screen frame and have their outer edge portions inset from the plane of the inner portions, as indicated at 16, to form a space 17 for accommodating actuating rods 18 for manipulating the louvers 19 of the shutter. The inset portions 16 of the side stiles are provided with a series of spaced openings 20 for mounting the louver trunnions 21.

The frame 2 also includes upper and lower rails 22 and 23 formed of sheet metal and shaped to provide base flanges 24 corresponding to the flanges of the sides and outwardly extending web portions 25 terminating in inwardly extending flanges designated 26 for the upper rail and 27 for the lower rail, which flanges are shaped to cooperate with engaging portions of the adjacent louvers 19 to form light tight joints therebetween when the louvers are closed. The upper flange 26 is, therefore, bent outwardly at a slight incline and then inwardly to form an inner, substantially V-shaped groove or pocket 28, while the lower flange 27 is bent inwardly and then outwardly of the frame to provide a similar groove or pocket 29 on the outer side thereof as best illustrated in Figs. 5 and 6. The lower flange 27 is also inset from the front edge of the forward portions of the side stiles.

The adjoining ends of the side stiles and rails are secured together in a suitable manner to provide a rigid light tight joint, for example, as by welding, the base flanges being cut on miters so that they are positioned in the same plane and the lip portions thereof are adapted to closely engage the face of the frame 6 to exclude the possibility of light rays passing therebetween. If desired, the frame 6 may be grooved so that the wing portions fit therein to further exclude the possibility of light rays passing thereunder.

The guard strips 13 have their outer edges engaged between the base flanges of the shutter frame and the marginal edges of the screen covering 12, while their opposite edges extend inwardly of the rear opening 4 so as to provide a light guard and prevent direct light rays from passing between the ends of the louvers and the inner faces of the sides of the frame.

Figure 7:
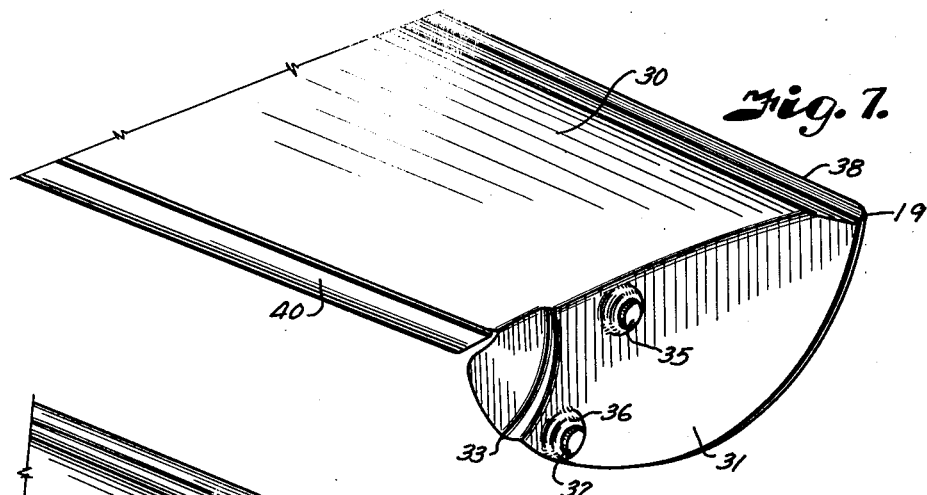
Fig. 7 is an inside view of the end of one of the louvers particularly illustrating the pocket in the end wing or flange to accommodate the opposite end portion of the end wing on an adjacent louver when the louvers are closed.
Figure 8:
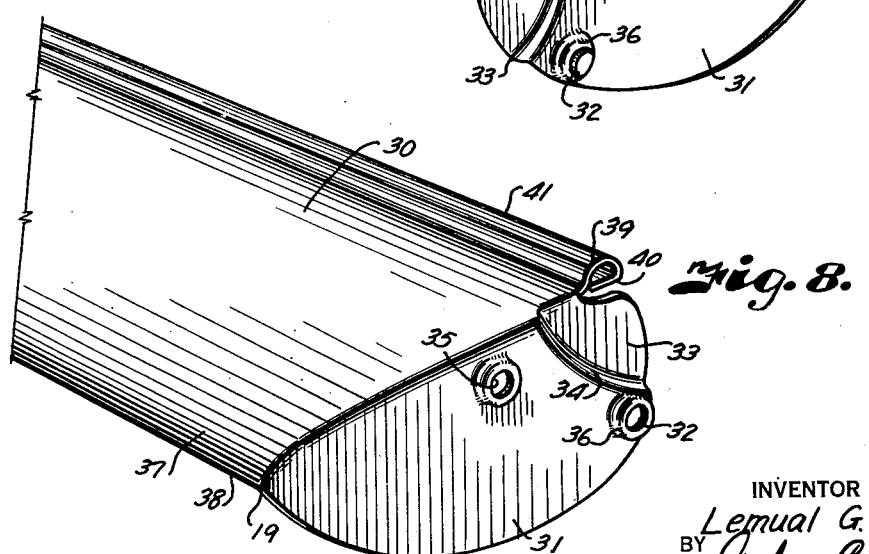
Fig. 8 is a similar perspective view of the end of one of the louvers as viewed from the outer side of the wing.

The louvers 19 are best illustrated in Figs. 7 and 8 and are formed of sheet metal having body portions 30 crowned slightly through the centers thereof to enhance their rigidity and the ends are provided with laterally extending wings or flanges 31 adapted to work in close proximity to the inner face of the forward portions 16 of the frame sides. The end wings are coextensive with the width of the louvers and are of substantially arcuate shape, the inner end portions of which are slightly enlarged to accommodate openings 32 for rods 18 previously mentioned, and provide pockets 33 which are formed by striking the metal inwardly. These pockets receive the opposite end portion of an adjacent louver when the louvers are closed. The end structure of the louvers forms an important part in providing a tightly closing structure and in excluding light rays from passing through the structure when the louvers are closed.

The pockets have rounded bottoms 34 so as to permit arcuate movement of the opposite edge portions of an adjacent louver when the louvers are closed. This structure also provides for extension of the wings to the edges of the louvers so that when the louvers are open and adusted to prevent sunrays from passing between the louvers, the wings prevent passing of sunrays into the room from ends of the louvers.

The louver wings are also provided with trunnion openings 35 substantially at the centers thereof and in close relation with the under face of the body portions to accommodate the trunnions 21 by which the louvers are pivoted within the frame 2, the trunnions being in the form of rivets extending through the openings 20 previously described. The openings 32 and 35 are preferably formed within embossed portions 36 so as to provide working clearance between the forward portions of the side stile and the inner faces of the rods 18.

The forward edges of the body portions of the louvers are bent at an angle slightly from the plane thereof, as indicated at 37, and the terminal edges are bent retractively to form a finished edge and provide a substantially hook-like lip 38. The rear edges of the louvers are formed by bending the edges of the metal outwardly, as at 39, and then retractively, as at 40, to provide a finished edge and oppositely positioned hook-like lip portions 41.

The rods 18 interconnect all of the louvers so that they are operated simultaneously by means of an operating mechanism now to be described.

The operating mechanism includes a socket-like crank-shaft 42 journalled within aligning openings in bracket plates 43 attached to the opposite faces of the window screen frame by fastening devices, such as screws 44. The sockets at inner ends of the shafts are provided with crank-like handles or keys 45 by which the shafts may be rotated. The outer ends of the shafts are provided with radially extending arms 46 that are connected with the ends of links 47. The links operate between the outer face of the screen and the louvers, consequently the central flat portions are positioned so that they reciprocate in a plane parallel with the screen and the lower ends are bent outwardly to connect with the ends of the crank-arms 46 by pivots 48. The upper ends of the links have twists 48' by which they are located in convenient position to connect with one of the pivots by which the louvers are connected with the actuating rods.

In order to prevent light passing between the ends of the louvers and the side stiles of the supporting frame, the forward edges of the louvers carry angle-shaped guards 49 and 50. One of the legs or flanges 51 of each guard overlaps the ends of the louvers and the other legs or flanges 52 are spaced from the end flanges of the louvers a sufficient distance so that when the louvers are closed the flanges clear the forward portions of the side stiles and overlap the outer faces thereof as shown in Fig. 6. The guards may be pivotally attached to the forward edges of the louvers in any suitable manner but are here shown as being secured to selected louvers by hinges 53. The guards 49 and 50 are substantially coextensive with the height of the frame and shift upwardly and outwardly therefrom when the louvers are opened.

In operating a shutter constructed and assembled as described, the shutters are opened and closed by rotating the cranks or keys 45 in the proper directions. Assuming that the louvers are open, as illustrated in Figs. 1, 3 and 4, the cranks are operated so that the arms 46 exert an upward thrust on the links 47 causing the actuating rods 18 to shift upwardly and rocking all of the louvers on their trunnions to bring the hook-like lip portions at the front of the respective louvers into overlapping, substantially hooking engagement with the hook-like lip portions at the rear edge of adjacent louvers as illustrated in Figs. 7 and 8. The hook-like lips thus form a substantially light-proof joint in that light rays from the interior of the building cannot pass therebetween. When the louvers are in closed position the pivots connecting the crank-arms with the links 47 pass upper dead center positions to lock the louvers closed. When the louvers are closed the outer hook-like lip on the lower louver engages in the groove formed in the front of the lower rail and the rear hook-like lip of the uppermost louver engages in the groove formed in the inner face of the upper rail to prevent leakage of light rays therebetween. As the louvers are moved toward closing position, the angle-shaped guards 49 and 50 swing into position with the legs or flanges 52 thereof overlapping the forwardly projecting portions of the shutter frame so as to provide a light trap to exclude escape of any light rays between the ends of the louvers and the side stiles on which they are pivoted. The overlapping portions at the ends of adjacent louvers permit the wings to extend completely across the width of the members for preventing sunrays from passing between the ends of the louvers when they are in open position. When in closed positions the pockets also cooperate to enhance the light-proof character of the shutter structure. The insets 16 formed in the side members act in cooperation with the shiftable guard on the front edge of the fixed louvers and the fixed guards in the inner side of the frame to offer further entrapment of any light rays that may tend to pass between the ends of the members and the sides of the frame.

When the louvers are to be opened, the rotation of the cranks is reversed so as to move the actuating rods downwardly and raise all of the louvers to open position, as shown in Figs. 1, 3 and 4. When the louvers are open, the angle-like guards swing upwardly and outwardly from the frame as illustrated.

From the foregoing it is obvious that I have provided a shutter structure wherein the louvers are all adapted to close tightly so that they afford protection in times of war against shell fragments, flying debris and the like resulting from bomb explosions. The shutter also provides complete "blackout" of the window or door opening which it protects for the reason that the shutter closes tightly and is provided with light traps to exclude passage of light rays between the joints thereof.

What I claim and desire to secure by Letters Patent is:

1. A shutter including, a frame having a plurality of louvers extending across the frame and provided with overlapping edges to close the opening formed by the frame, and wings extending laterally from the ends of the louvers and corresponding in length to the width of the louvers including said lapping portions, the ends of said wings on adjacent louvers being formed to lap each other.

2. A shutter including, a frame having a plurality of louvers extending across the frame and provided with overlapping edges to close the opening formed by the frame, wings extending laterally from the ends of the louvers and corresponding in length to the width of the louvers including said lapping portions, said wings being arranged to lap when the louvers are closed, and pockets on said wings to receive the lapping portion of the next adjacent wing of the louvers.

3. A shutter including, a frame having a plurality of louvers extending across the frame to close the opening formed by the frame, said louvers having hook-like interengaging lip portions to form light traps therebetween, wings extending laterally from the ends of the louvers and corresponding in length to the width of the louvers, said wings being arranged to lap when the louvers are closed, and pockets on said wings to receive a lapping portion of the next adjacent wing of the louvers.

4. A shutter including, a frame, a plurality of louvers extending across the frame and cooperating with each other to close the opening formed by said frame, wings extending laterally from the ends of the louvers and corresponding in length to the width of the louvers, means pivoting said wings on the sides of the frame, the ends of said wings on adjacent louvers being formed to lap each other, light guards having pivotal support on selected louvers and having portions cooperating with the frame to form a light trap for any light rays that may tend to leak between the louvers and said frame, and means separate from said light guards for actuating the louvers, said actuating means being arranged to form a lock for retaining all of said movable parts in closed position.

5. A shutter including a frame having a plurality of louvers extending across the frame and provided with overlapping edges to close the opening formed by the frame, wings extending laterally from the ends of the louvers and corresponding in length to width of the louvers including said lapping portions, means pivoting said wings on sides of the frame, the ends of said wings on adjacent louvers being formed to lap each other, and light guards having pivotal support on selected louvers and having flanges extending over outer side faces of the louvers and flanges adapted to overlap sides of the frame pivoting said wings.

6. A shutter including a frame having a plurality of louvers extending across the frame and provided with overlapping edges to close the opening formed by the frame, wings extending laterally from the ends of the louvers and corresponding in length to the width of the louvers including said lapping portions, means pivotally connecting the wings with sides of the frame, said wings being arranged to lap when the louvers are closed, pockets on said wings to receive the lapping portion of the next adjacent wing of the louvers, and light guards having pivotal support on selected louvers and having flanges extending over outer side faces of the louvers and flanges adapted to overlap sides of the frame pivoting said wings.

7. A shutter including, a frame having a plurality of louvers extending across the frame and provided with front and rear edges adapted to lap one another when the louvers are in closed position and end wings coextensive with the width of the louvers and spaced from the frame, said wings having openings therein, means engaging said end wings through said openings pivoting the ends of the louvers on the frame, guards shiftable with the louvers and having flanges adapted to extend over face sides of said louvers and having flanges overlapping outer sides of said frame when the louvers are closed to form light traps for any light rays that may leak between the pivoted ends of the louvers and said frame, and guards projecting inwardly from the sides of the frame and cooperating with the shiftable guards for excluding said light rays.

8. A shutter including, a frame having side stiles provided with louver supporting flanges inset from the body portions of said stiles, a plurality of louvers extending across the frame and provided with front and rear edges adapted to overlap one another when the louvers are in closed position and substantially arcuate shaped end wings coextensive with the width of the louvers and spaced from the frame, said wings having openings therein, means engaging said end portions through said openings pivotally trunnioning the ends of the louvers on said inset flanges, and angle-shaped guards shiftable with the louvers and having flanges lapping outer faces of said inset flanges to form light traps for any light rays that may leak between the pivoted ends of the louvers and said frame.

9. A shutter including, a frame having side stiles provided with louver supporting flanges inset from the body portions of said stiles, a plurality of louvers extending across the frame and provided with front and rear edges adapted to overlap one another when the louvers are in closed position and substantially arcuate shaped end wings coextensive with the width of the louvers having openings therein, means engaging said end wings through said openings pivotally trunnioning the ends of the louvers on said inset flanges, angle-shaped guards shiftable with the louvers and having flanges lapping outer faces of said inset flanges to form light traps for any light rays that may leak between the pivoted ends of the louvers and said frame, and guards projecting inwardly from the frame and cooperating with the shiftable guards in excluding said light rays when the louvers are closed.

LEMUAL G. BROWN.

Disclaimer 2,359,289.—*Lemual G. Brown*, Oklahoma City, Okla. SHUTTER. Patent dated Oct. 3, 1944. Disclaimer filed May 18, 1951, by the assignee, *J. E. Bush*.

Hereby enters this disclaimer to claims 1, 2, and 3, of said patent.

[*Official Gazette June 26, 1951.*]